United States Patent
Bessiere et al.

(10) Patent No.: US 6,821,461 B1
(45) Date of Patent: Nov. 23, 2004

(54) METHOD FOR MOULDING AN OPTICAL LENS AND CORRESPONDING INSTALLATION

(75) Inventors: Benoît Bessiere, Saint Maur des Fosses (FR); Naissan Bouslimi, Paris (FR); Marianne Labussiere, Tassin la Demi Lune (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 0 days.

(21) Appl. No.: 09/979,665

(22) PCT Filed: Apr. 19, 2000

(86) PCT No.: PCT/FR00/01024

§ 371 (c)(1),
(2), (4) Date: Sep. 13, 2002

(87) PCT Pub. No.: WO00/73048

PCT Pub. Date: Dec. 7, 2000

(Under 37 CFR 1.47)

(30) Foreign Application Priority Data

May 26, 1999 (FR) .............................. 99 06617

(51) Int. Cl.⁷ .............................................. B29D 11/00
(52) U.S. Cl. ........................ 264/2.5; 264/40.1; 425/150; 425/175; 425/808

(58) Field of Search ................................. 264/1.1, 1.32, 264/2.5, 40.1; 425/808, 150, 175

(56) References Cited

U.S. PATENT DOCUMENTS

| 4,786,444 A | 11/1988 | Hwang |
| 5,372,755 A | 12/1994 | Stoerr et al. |
| 5,547,618 A | 8/1996 | Magne |
| 5,733,585 A | 3/1998 | Vandewinckel et al. |

FOREIGN PATENT DOCUMENTS

FR       1136497       4/1963

*Primary Examiner*—Mathieu D. Vargot
(74) *Attorney, Agent, or Firm*—Young & Thompson

(57) ABSTRACT

A method for molding an optical lens by using two moulding shells and a closing element acting in the periphery thereof. The moulding shells are placed in holding elements. If necessary, one of the holding elements is made to rotate around a centering axis which is common to the unit. The moulding shells are removed from the holding elements using removing elements. The possible inclination of the moulding shells is verified in relation to a reference plane. If necessary, their position is adjusted in relation to the removing elements which bear them. Both of the moulding shells are moved towards each other using the removing elements while maintaining their position in relation thereto. The closing element is placed around the moulding shells and the moulding cavity thus formed is filled. The invention can be used with optical lenses which are made of a polymerizable material.

20 Claims, 1 Drawing Sheet

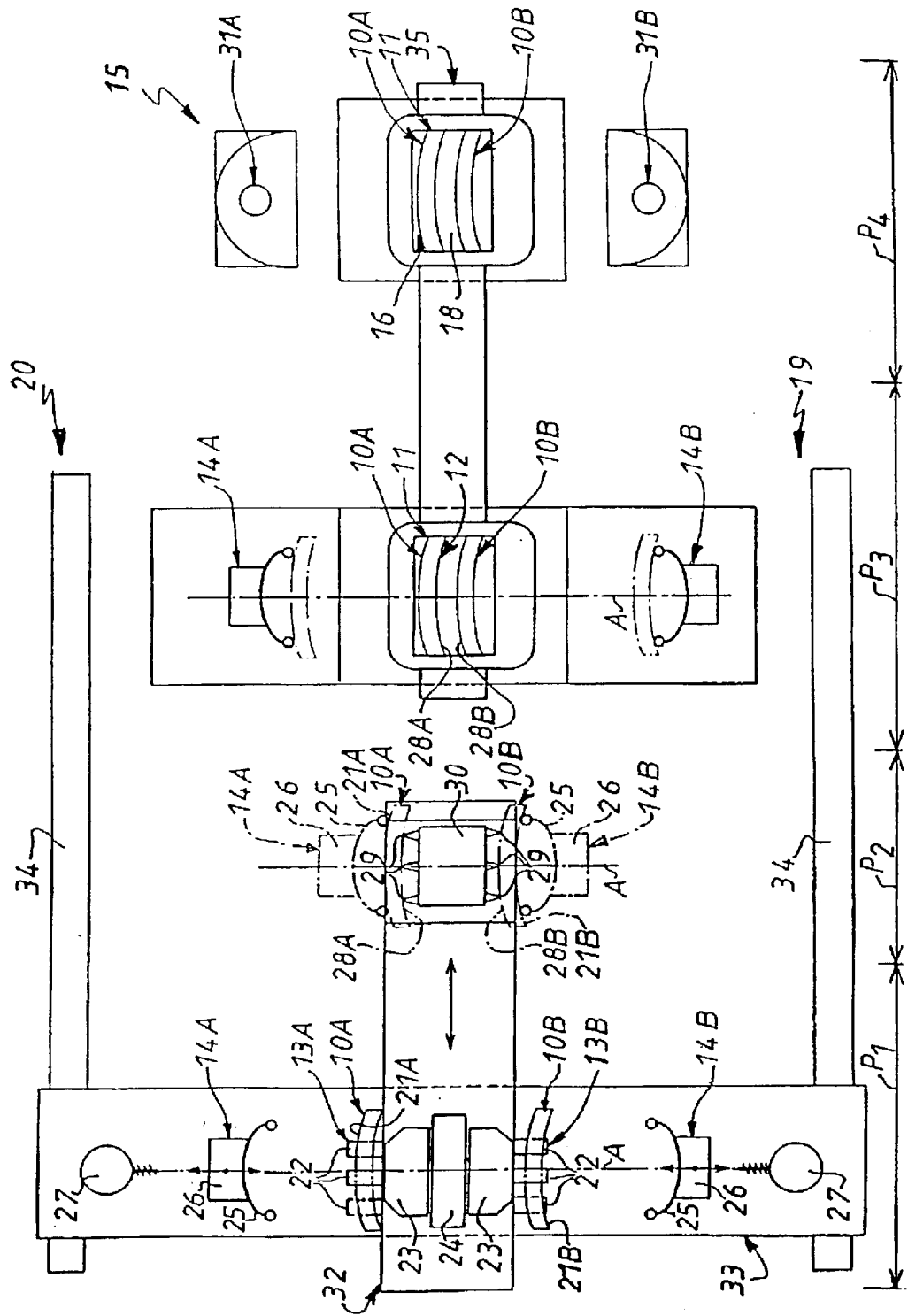

METHOD FOR MOULDING AN OPTICAL LENS AND CORRESPONDING INSTALLATION

CROSS REFERENCE TO RELATED APPLICATION

This is the 35 USC 371 national stage of International Application PCT/FR00/01024 filed on 19 Apr. 2000, which designated the United States of America.

FIELD OF THE INVENTION

The present invention relates generally to molding optical lenses, more particularly, although not necessarily exclusively, ophthalmic lenses, i.e. spectacle lenses, in particular when the corresponding molding material is a synthetic material that can be polymerized by irradiation.

BACKGROUND OF THE INVENTION

As is known in the art, two molding shells are usually employed to mold an optical lens and adapted to define between them, in conjunction with a closure member operative at their periphery, the necessary molding cavity, and the latter is filled with molding material.

At present, in mass production, some or all of the corresponding operations are usually carried out manually.

However, nowadays, to meet the expectations of interested parties, who wish to take delivery as quickly as possible, and nevertheless to satisfy a large number of envisagable prescriptions, which can be highly varied, there is a requirement for unitary production.

As a corollary to this it is desirable for at least some of the diverse operations required to be fully or partly automated.

In this instance, the particular problem is that, to satisfy any particular prescription, it is necessary to ensure rigorous control of the position of the two molding shells relative to each other.

In the case of prescriptions requiring a torus, for example, the torus of the molded optical lens depends on the angular position of the two molding shells relative to each other, independently of the thickness at the center, which depends on the corresponding distance at the center between two molding shells, and the prism of the lens depends on any inclination of one or both of the molding shells relative to any transverse plane taken as a reference plane.

SUMMARY OF THE INVENTION

The present invention provides a method and an installation for surmounting these difficulties and in particular authorizing very fast fabrication of any ophthalmic lens responding to a given prescription, as soon as an order is received, and preferably in less than one hour.

The method according to the invention is generally characterized by the execution of the following operations: each of the two molding shells is placed in one of two respective individual holding means adapted to rotate about a common centering axis, if necessary, at least one of these holding means is turned about that centering axis, until the angular position is reached corresponding to the required torus, if any, each of the two molding shells is extracted from its holding means with the aid of picking means, the inclination, if any, of each of the molding shells with respect to a reference plane is checked with the molding shell engaged in this way with its picking means, if necessary, until the inclination corresponding to the required prism is reached, the position of at least one of the molding shells on its picking means is adjusted, the two molding shells are moved one toward the other with the aid of their picking means, preserving their position with respect to this picking means, the closure member is placed around the two molding shells, and the molding cavity formed in this way is filled with molding material.

If the molding material is a synthetic material that can be polymerized by irradiation, the combination consisting of two molding shells, the closure member and the mass of molding material filling the corresponding molding cavity is then exposed to irradiation means.

As a corollary of this, and ignoring any initial placing of each of the molding shells in holding means, the installation according to the invention includes the means for automatically executing the above various operations.

To be more precise, it includes, in addition to the necessary two holding means and two picking means, at least two separate workstations for executing the required operations and transfer means for relative movement of each molding shell with respect to each workstation.

The two molding shells are preferably treated at the same time.

To control their inclination, if any, relative to a reference plane, and therefore to obtain any required prism, the front face, and thus the active face, of each molding shell, i.e. its face which defines the molding cavity, is preferably pressed against feelers for assessing the distance of a chosen number of points on that active face relative to the reference plane adopted.

The use of such feelers is undoubtedly disclosed in French patent No. 1 316 497.

However, in French patent No. 1 316 497 the feelers are operative on the rear face of the molding shells, and thus on the opposite face of the molding shells to the molding cavity, and the molding shells are brought into contact with the feelers by injecting compressed air between them.

Under these conditions, it is not possible to ensure that the molding shells are not subjected to any unintentional movement, to the detriment of their relative position with respect to each other, when the compressed air supply is disconnected.

This does not apply when, in accordance with the invention, the feelers are operative directly on the active face of the molding shells, while each is being held correctly by its picking means.

As a corollary of this, the various transfer means operative from one workstation to another in the molding installation according to the invention advantageously guarantee conservation of the centering axis common to the two molding shells.

BRIEF DESCRIPTION OF THE DRAWINGS

The features and advantages of the invention will emerge further from the following description, which is given by way of example and with reference to the accompanying diagrammatic drawing, the single FIGURE in which is a block diagram of a molding installation according to the invention.

DETAILED DESCRIPTION OF THE INVENTION

As shown in the FIGURE, the overall aim is to assemble two molding shells 10A, 10B, one concave, the other convex, for molding an optical lens, for example an ophthalmic lens, i.e. a spectacle lens, respecting the prescription which this kind of ophthalmic lens must satisfy.

As is known in the art, the two molding shells 10A, 10B take the form of circular contour disks and, for the required molding operation, they are used conjointly with a closure member 11 operative at their periphery and with which they define the necessary molding cavity 12.

The molding shells 10A, 10B are made of glass, for example.

The closure member 11 can be a simple sleeve, made in one piece or in the form of a strip appropriately wound around the molding shells 10A, 10B.

However, instead of this, it can equally well, and preferably, be a device of the type that is the subject matter of French patent application No. 94 14927 filed 12 Dec. 1994, publication No. 2 727 895.

According to the invention, to carry out the molding operation, the following operations are executed: the two molding shells 10A, 10B are placed in the respective two individual holding means 13A, 13B adapted to rotate about a common centering axis A, if necessary, at least one of the holding means 13A, 13B is turned about the centering axis A, to obtain the required angular position for the two molding shells 10A, 10B with respect to each other, i.e. the angular position corresponding to the required torus, if any, each of the two molding shells 10A, 10B is extracted from its holding means 13A, 13B by the picking means 14A, 14B, the inclination, if any, of each of the molding shells 10A, 10B with respect to a reference plane is checked with the molding shell 10A, 10B interengaged in this way with its picking means 14A, 14B, if necessary, the position of at least one of the molding shells 10A, 10B on its picking means 14A, 14B is adjusted to obtain the inclination corresponding to the required prism, the two molding shells 10A, 10B are moved toward each other by their picking means 14A, 14B, preserving their position with respect to said picking means 14A, 14B, the closure member 11 is disposed around the two molding shells 10A, 10B, and the molding cavity 12 formed in this way is filled with molding material.

If the molding material is a synthetic material that can be polymerized by irradiation, which is usually the case in practice, the combination 16 consisting of two molding shells 10A, 10B, the closure member 11 and the mass 18 of molding material then filling the corresponding molding cavity 12 is exposed to irradiation means 15.

Apart from the two holding means 13A, 13B each adapted to grasp a molding shell 10A, 10B and adapted to rotate about a common centering axis A and the two picking means 14A, 14B each adapted to extract a molding shell 10A, 10B from its holding means 13A, 13B, the molding installation 19 in accordance with the invention includes, globally, on the one hand, at least two separate workstations P1, P2, P3, P4 for executing the necessary operations and, on the other hand, and as described in more detail later, transfer means 20 adapted to move each of the molding shells 10A, 10B with respect to each of the workstations P1, P2, P3, P4.

As is the case in the molding installation 19 shown, the two molding shells 10A, 10B are preferably treated at the same time.

The molding installation 19 is not described in complete detail here.

Only its essential components are succinctly described hereinafter.

In the embodiment shown, the molding installation 19 in accordance with the invention includes, firstly, a first workstation P1 which, by virtue of its equipment, and as will become more comprehensively apparent hereinafter, is adapted to place each of the molding shells 10A, 10B in its holding means 13A, 13B, center the molding shell 10A, 10B with respect to the centering axis A, and, if necessary, rotate at least one of the holding means 13A, 13B about the centering axis A to adjust the torus, if any, required for the optical lens to be molded.

For example, and as shown diagrammatically in the FIGURE, the holding means 13A, 13B are part of the equipment of the first workstation P1, and each of the holding means 13A, 13B includes three jaws 22, by mean$ of which it is adapted to grasp a molding shell 10A, 10B by its edge, thereby operating at the periphery of the molding shell 10A, 10B, and which are movably mounted on a base 23 which is itself rotatably mounted on a plinth 24 around the centering axis A common to the whole system.

The jaws 22 are preferably also operative on the rear face 21A, 21B of the molding shell 10A, 10B concerned, i.e. on the opposite face thereof to the molding cavity 12.

Accordingly, during a first step, the holding means 13A, 13B advantageously ensure, simultaneously, the centering, by its edge, that is to say by its edge surface, of a molding shell 10A, 10B, and its placement, by its rear face 21A, 21B, on three reference points, in this instance the corresponding three jaws 22.

In the embodiment shown, the bases 23 of the two holding means 13A, 13B are back-to-back on the same plinth 24 so that, from one of the holding means 13A, 13B to the other, the jaws 22 are directed in opposite directions with respect to each other.

For example, for the required centering, the jaws 22 are mounted to move in a radial direction on the base 23 that carries them.

As a corollary of this, in this embodiment, each of the picking means 14A, 14B intended to enable extraction of the molding shells 10A, 10B from their holding means 13A, 13B includes a sucker 25 mounted like a ball-and-socket joint on a support 26.

In accordance with dispositions that are not shown in the FIGURE, the ball-and-socket joint operative in this way between the sucker 25 and the support 26 can preferably be locked at will.

For example, and as shown diagrammatically in the FIGURE, each picking means 14A, 14B is under the control of a motor 27 adapted to drive reciprocating movement thereof along the centering axis A.

In the embodiment shown, the molding installation 19 according to the invention includes a second workstation P2, which, by virtue of its equipment, and as will become more comprehensively apparent hereinafter, is adapted to control the inclination, if any, of each of the molding shells 10A, 10B with respect to a reference plane, to adjust the required prism of the optical lens to be molded.

For the purposes of this control, and as shown diagrammatically in dashed outline in the FIGURE, the active face 28A, 28B, that is to say the front face, of each of the molding shells 10A, 10B is preferably pressed against at least three feelers 29, the active face 28A, 28B being the face of the molding shell 10A, 10B that contributes to defining the molding cavity 12, and which is a concave face for the molding shell 10A and a convex face for the molding shell 10B.

For each of the molding shells 10A, 10B, the equipment of the second workstation P2 of the molding installation 19 according to the invention therefore includes a set of at least three feelers 29, of which at least two are mobile parallel to the centering axis A.

For example, four feelers 29 are provided, in a cruciform arrangement with respect to each other.

In the embodiment shown, the equipment of the second workstation P2 includes two sets of feelers 29 back-to-back on a common support 30, one for each molding shell 10A, 10B.

Clearly, the reference plane taken into account at the time of the intervention of the feelers 29 is a plane transverse to the centering axis A.

When checking the inclination, if any, of the molding shells 10A, 10B with respect to this reference plane, the distance at the center of each of the molding shells 10A, 10B with respect to the reference plane is preferably also taken into account, by means of the feelers 29.

Be this as it may, defining the reference in this way in the workstation P2 and on the active faces 28A, 28B of the molding shells 10A, 10B advantageously compensates any prism errors between the faces of each of the molding shells 10A, 10B during a second step.

In the embodiment shown, the molding installation 19 according to the invention includes a third workstation P3 which, by virtue of its equipment, and as will become more completely apparent hereinafter, is adapted to move the two molding shells 10A, 10B, one toward the other, taking account of the distance at the center previously measured, which adjusts the required thickness at the center of the optical lens to be molded, and, equally, is adapted to dispose the closure member 11 around the two molding shells 10A, 10B and to fill the molding cavity 12 then formed in this way with molding material.

In this embodiment, the molding installation 19 according to the invention further includes a fourth workstation P4 which, by virtue of its equipment, is adapted to irradiate the combination 16 previously obtained as required.

In practice, the equipment of the fourth workstation P4 is reduced to the irradiation means 15

For example, and as shown diagrammatically in the FIGURE, the irradiation means 15 include two ultraviolet radiation lamps 31A, 31B, which are disposed facing each other, at a distance from each other, and between which the combination 16 to be irradiated is inserted.

As a corollary of this, the transfer means 20 of the molding installation 19 according to the invention include, firstly, in the embodiment shown, a table 32 which is adapted to reciprocate between the first workstation P1 and the second workstation P2, in a direction substantially perpendicular to the centering axis A, and carries the equipment of each of these workstations P1, P2.

The transfer means 20 then include a second table 33 which is adapted to reciprocate between the first workstation P1 and the third workstation P3 and on which the picking means 14A, 14B and the motor 27 thereof operate.

For example, and as shown diagrammatically in the FIGURE, the second table 33, which is globally orthogonal to the first table 32, moves on rails 34.

In the embodiment shown, the transfer means 20 finally include a third table 35 which is adapted to reciprocate between the third workstation P3 and the fourth workstation P4, in a direction substantially perpendicular to the centering axis A, and on which the closure member 11 operates, in particular when, as envisaged hereinabove, that closure member 11 is a device of the type described in French patent No. 94 14927.

Of course, the various tables 32, 33 and 35 used in this way are motorized.

In service, the molding shells 10A, 10B are first loaded onto the holding means 13A, 13B, i.e. the molding shells 10A, 10B are placed between the jaws 22 of the holding means 13A, 13B, then the molding shells 10A, 10B are centered by the action of the jaws 22 that grip them, and, finally, the required torus, if any, is adjusted.

The suckers 25 of the picking means 14A, 14B are then applied to the molding shells 10A, 10B and the molding shells 10A, 10B are extracted from the holding means 13A, 13B by the picking means 14A, 14B.

As will be noted, the picking means 14A, 14B operate on the rear face 21A, 21B of the molding shells 10A, 10B.

After the necessary movement of the table 32, the picking means 14A, 14B press the molding shells 10A, 10B against the feelers 29 of the second workstation P2 and the required prism is adjusted, if necessary, by modifying, for this purpose, the position of the suckers 25 with respect to the support 26 that carries them.

The picking means 14A, 14B with which they remain engaged then disengage the molding shells 10A, 10B from the feelers 29 and the table 33 carrying the picking means 14A, 14B transfers them to the third workstation P3, for assembling them with the closure member 11 and filling the molding cavity 12 then formed in this way.

The table 35 thereafter transfers the corresponding combination 16 to the fourth workstation P4.

As will be noted, the molding installation 19 in accordance with the invention advantageously executes all of the required operations with no discontinuity.

Also, all the required operations can advantageously be effected mechanically, and therefore automatically, with the possible exception of those concerning the placing of the molding shells 10A, 10B in the holding means 13A, 13B, the centering of these molding shells 10A, 10B on the holding means 13A, 13B, any adjustment of their angular position, and any adjustment of their inclination.

Of course, the present invention is not limited to the embodiments described and shown, but encompasses any variant execution thereof.

What is claimed is:

1. A method of molding an optical lens by using two molding shells and a closure member acting at their periphery, which comprises the steps of:

placing each of the two molding shells in one of two respective individual holding means adapted to rotate about a common centering axis;

optionally turning at least one of the holding means about the centering axis;

extracting each of the two molding shells from its holding means with the aid of picking means;

checking whether each of the molding shells is inclined with respect to a reference plane with the molding shell engaged with its picking means;

adjusting if necessary, the position of at least one of the molding shells on its picking means;

moving the two molding shells one toward the other with the aid of their picking means while preserving their position with respect to said picking means;

placing the closure member around the two molding shells to form a molding cavity; and filling the molding cavity with molding material.

2. The method according to claim 1, wherein an active face of the molding shell is pressed against feelers during the checking step.

3. The method according to claim 1, further comprising taking account of the distance at the center of each of the molding shells relative to the reference plane during the checking step.

4. The method according to claim 1, wherein the molding material is a synthetic material that can be polymerized by irradiation; the method further comprising exposing a combination consisting of the two molding shells, the closure member, and the mass of molding material filling the molding cavity to irradiation means.

5. The method according to claim 1, wherein all of the steps are executed without discontinuity.

6. An optical lens molding installation including at least two separate workstations for carrying out the method according to claim 1, the installation comprising in addition to two holding means each adapted to grasp a molding shell and adapted to rotate about a common centering axis, and two picking means each adapted to extract a molding shell from its holding means, means for assembling the molding shells with a closure member, and transfer means adapted to move each of the molding shells with respect to each of the workstations.

7. The molding installation according to claim 6, wherein each of the holding means includes three jaws adapted to grasp a molding shell by an edge surface, said holding means adapted to move on a base, which itself can rotate on a plinth.

8. The molding installation according to claim 7, wherein the jaws are adapted to act on a rear face of the molding shell concerned.

9. The molding installation according to claim 7, wherein the bases of the two holding means are on opposite sides of the same plinth.

10. The molding installation according to claim 7, wherein each picking means includes a sucker mounted ball-and-socket joint fashion on a support.

11. The molding installation according to claim 10, wherein the ball-and-socket joint operative between the sucker and the support can be locked at will.

12. The molding installation according to claim 6, including a first workstation structured and adapted to place each of the molding shells in its holding means, and, if necessary, to rotate at least one of the holding means about the centering axis.

13. The molding installation according to claim 12, including a second workstation structured and adapted to check the inclination of each of the molding shells with respect to a reference plane.

14. The molding installation according to claim 13, wherein for each of the molding shells, the second workstation includes a set of at least three feelers.

15. The molding installation according to claim 14, wherein the second workstation includes two sets of feelers on opposite sides of a common support, one for each molding shell.

16. The molding installation according to claim 12, including a third workstation structured and adapted to move the two molding shells one relative to the other, place the closure member around the two molding shells to form a molding cavity, and fill the molding cavity with molding material.

17. The molding installation according to claim 16, including a fourth workstation structured and adapted to irradiate a combination consisting of the two molding shells, the closure member, and the mass of molding material filling the molding cavity.

18. The molding installation according to claim 13, wherein the transfer means include a table which is adapted to reciprocate between the first workstation and the second workstation, and which carries equipment of each of the workstations.

19. The molding installation according to claim 16, wherein the transfer means include a table which is adapted to reciprocate between the first workstation and the third workstation.

20. The molding installation according to claim 17, wherein the transfer means include a table which is adapted to reciprocate between the third workstation and the fourth workstation.

* * * * *